United States Patent
Vreeken et al.

(10) Patent No.: US 6,517,059 B1
(45) Date of Patent: Feb. 11, 2003

(54) LEAF SPRING INSERT AND METHOD FOR ASSEMBLING A LEAF SPRING

(75) Inventors: Percy P. Vreeken, Grosse Pointe Farms, MI (US); Philip W. Gilbert, New Baltimore, MI (US)

(73) Assignee: TransNav, Inc., New Baltimore, MI (US)

( * ) Notice: Subject to any disclaimer, the term of this patent is extended or adjusted under 35 U.S.C. 154(b) by 0 days.

(21) Appl. No.: 09/617,902

(22) Filed: Jul. 17, 2000

(51) Int. Cl.⁷ .................................................. F16F 1/20
(52) U.S. Cl. ....................................................... 267/49
(58) Field of Search ........................... 267/30, 36.1, 47, 267/49, 52, 53; 411/41, 43, 45, 48, 510; 280/124.17, 124.174

(56) References Cited

U.S. PATENT DOCUMENTS

| | | | | |
|---|---|---|---|---|
| 2,346,092 A | * | 4/1944 | Tollzien .................... | 267/49 |
| 2,355,801 A | * | 8/1944 | Hildenbrand ............... | 267/49 |
| 2,446,589 A | * | 8/1948 | Hildenbrand ............... | 267/49 |
| 2,890,041 A | * | 6/1959 | Runton et al. .............. | 267/49 |
| 2,920,884 A | * | 1/1960 | Rowland et al. ............ | 267/49 |
| 3,385,157 A | * | 5/1968 | Rapata ........................ | 411/41 |
| 3,385,158 A | * | 5/1968 | Morin ......................... | 411/45 |
| 3,918,130 A | * | 11/1975 | Poe ............................. | 411/41 |
| 4,083,289 A | * | 4/1978 | Erickson ..................... | 411/43 |
| 4,085,651 A | * | 4/1978 | Koscik ........................ | 411/41 |
| 4,840,523 A | * | 6/1989 | Oshida ........................ | 411/48 |
| 5,286,152 A | * | 2/1994 | Anderson .................... | 411/45 |
| 5,706,559 A | * | 1/1998 | Oliver et al. ................. | 24/297 |
| 6,056,276 A | * | 5/2000 | Muzio ........................ | 267/36.1 |
| 6,311,960 B1 | * | 11/2001 | Pierman et al. .............. | 267/49 |
| 6,354,574 B1 | * | 3/2002 | Oliver et al. ................. | 267/49 |

* cited by examiner

*Primary Examiner*—Jack Lavinder
*Assistant Examiner*—Thomas J. Williams
(74) *Attorney, Agent, or Firm*—Harness, Dickey & Pierce, P.L.C.

(57) ABSTRACT

An insert disposed between two cooperating leaf springs. The insert includes a body including a stem having a plurality of radially extending ribs inserted into an aperture in a first leaf spring. The body includes a face which slidably engages a second leaf spring. The face includes a plurality of circular protrusions extending therefrom. A pin is inserted into a central bore formed by cooperating fingers that form the body, causing an outwardly extending radial retention force to be exerted onto the surface of the aperture in the first leaf spring.

15 Claims, 4 Drawing Sheets

LEAF SPRING INSERT AND METHOD FOR ASSEMBLING A LEAF SPRING

FIELD OF THE INVENTION

The present invention relates generally to leaf springs and, more particularly, to an insert adapted to be disposed between leaf springs to reduce noise.

BACKGROUND

In a conventional manner, leaf springs are used at each side of a vehicle to provide the suspension mechanism between the frame of the vehicle and the axle. Leaf springs are used in many applications, and more prominently in pickup trucks and other large trucks. The general configuration of a leaf spring includes an upper leaf spring pivotally fixed at one end to the frame and the other end connected via a shackle to the frame of the vehicle. An axle is mounted at an intermediate point along the length of the spring. The arrangement results in a leaf spring having a generally elliptic contour. Usually, a plurality of leaf springs are mounted in decreasing length under the upper spring. The vertical displacement of an axle allows a leaf spring to flex according to factors such as spring thickness and mounting position. As a vertical force is introduced into the leaf spring configuration, the individual springs are encouraged to slidably engage each other as the elliptical contour flattens out and the displacement force is dampened. The sliding engagement of a first leaf spring and a second leaf spring can result in unpleasant frictional noises.

The frictional noise associated with a leaf spring configuration have been addressed by providing a plastic insert having a disk portion and a stem portion. The stem portion is inserted through an aperture in a first leaf spring and the disk portion is aligned for slidable engagement with an opposing, second leaf spring. This approach reduces frictional noise but also presents drawbacks. Often the paint and sediment associated with the coating on a leaf spring becomes trapped between the insert and the spring resulting in added frictional noise. Further, existing inserts do not engage the leaf spring to which they are mounted as positively as possible.

Thus, it is desirable to provide a textured surface on the face of the plastic insert to facilitate removal of the paint and sediments to prevent the formation of high spots on the spring. It is also desirable to provide an increased retention force from the stem onto the inner wall forming an aperture of the leaf spring.

SUMMARY OF THE INVENTION

It is an object of the present invention to provide an insert adapted to be disposed between an upper and lower leaf spring that is capable of decreasing the frictional noise created from conventional leaf spring configurations.

It is another object of the present invention to provide an insert having a body including an aperture, a stem having a plurality of fingers including a plurality of radially extending ribs, and a pin adapted to be inserted through a central bore formed from the fingers and causing the side portions to expand in outward directions.

It is a further object of the present invention to provide an insert having a body with a face including a plurality of protruding members which slidably engage the lower surface of an adjacent leaf spring.

It is yet another object of the present invention to provide an insert with a body and a stem having an inwardly extending ridge portion that cooperates to secure an outwardly extending ridge portion on the pin.

It is yet another object of the present invention to provide a pin having a first end and a second end. The first end has an outer diameter that increases when traversing the pin from the first end toward the second end.

It is yet another object of the present invention to provide a one-piece molded component having a body including a stem with a pin interconnected thereto.

It is yet another object of the present invention is to provide a leaf spring insert which is simple in structure, inexpensive to manufacture, and durable in use.

The present invention is directed to an apparatus for reducing frictional noise between leaf springs. The apparatus includes a body having an aperture and a stem having a central bore defined by a plurality of fingers. The plurality of fingers has first and second ends, where the first ends of the plurality of fingers are coupled to a surface of the body around the perimeter of the aperture and projecting away from the surface body. A plurality of retainers are formed on an outer surface of at least one of the plurality of fingers. An insert portion is inserted through the central bore of the stem, thereby expanding the fingers in outward directions.

This invention is also directed to a leaf spring assembly including a first leaf spring and a second leaf spring having an aperture. An insert is disposed between the first and second leaf springs. The insert includes a body portion and a stem portion. The stem portion has a plurality of fingers adapted to be inserted through the aperture of the second leaf spring. A pin is adapted inserted through a central bore formed by the plurality of fingers, thereby displacing said first and second fingers outwardly to engage said aperture.

This invention is also directed to a method of reducing frictional noise associated with a first leaf spring and an adjacent second leaf spring. The method includes the step of molding a one piece component including a base, a stem portion having a central bore, and a pin interconnected to the stem portion. The method also includes the steps of inserting the stem portion through an aperture in a first leaf spring and removing the pin from the stem portion and displacing the pin into the central bore.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
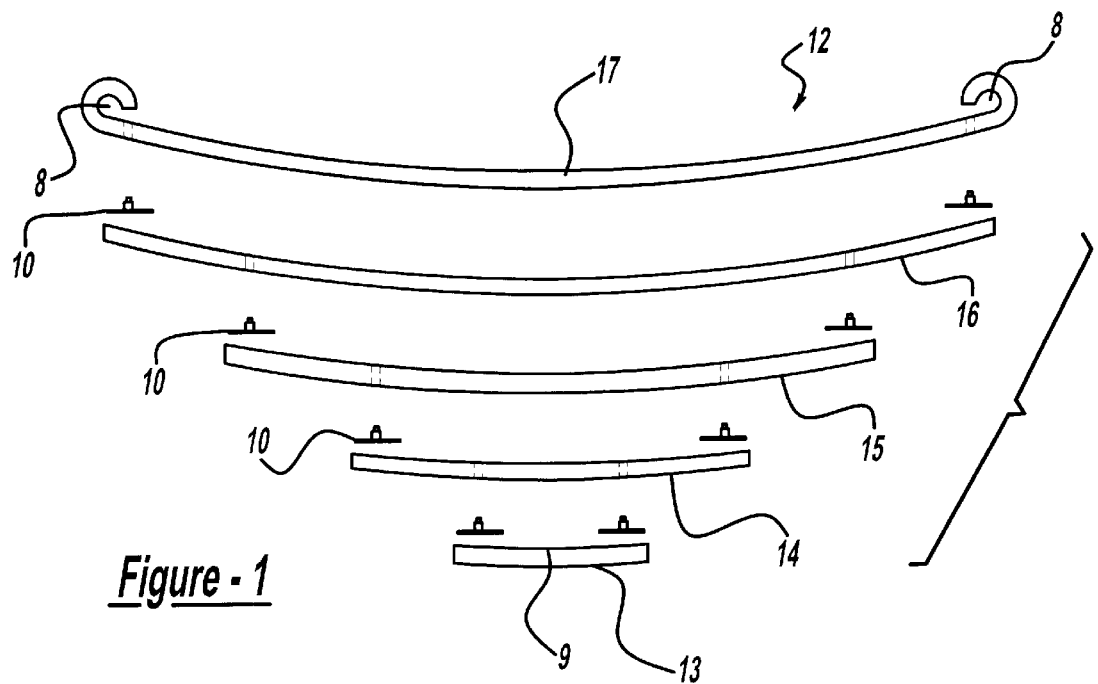
FIG. 1 is an exploded, side view of a conventional leaf spring configured with the leaf spring inserts of the present invention.
Figure 2:
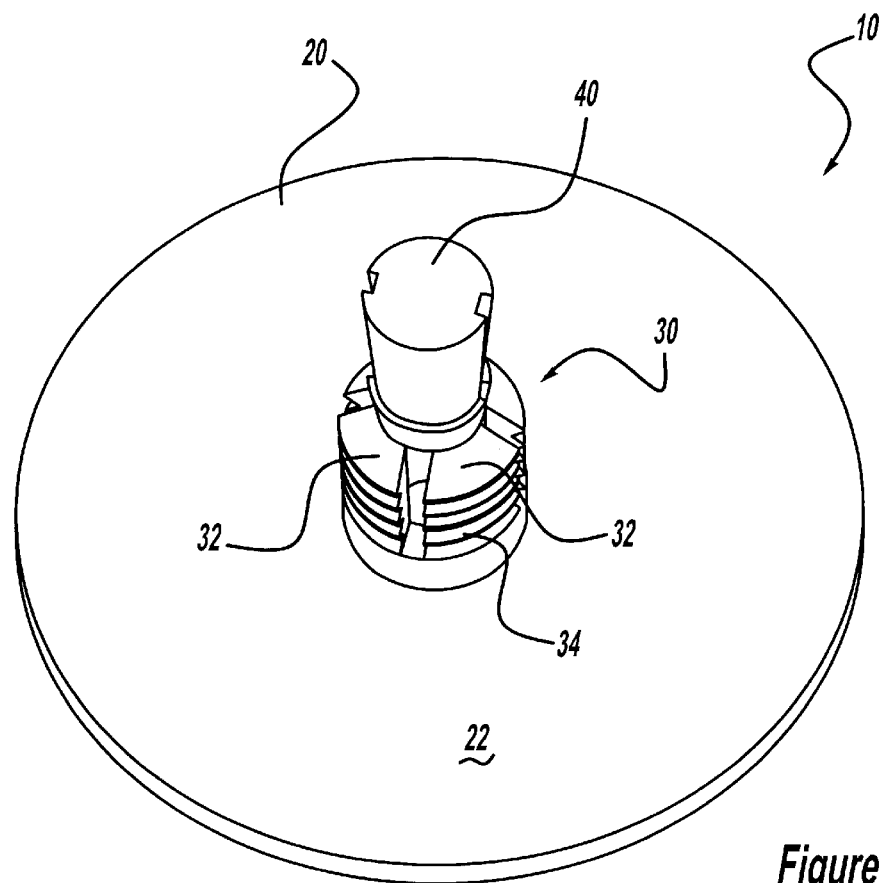
FIG. 2 is a perspective view of the leaf spring insert as a single piece prior to separation of the pin insert from the stem portion.

Referring to the drawings, with specific reference to FIGS. 1 and 2, the leaf spring insert according to the teachings of the present invention is indicated generally with reference numeral 10. The leaf spring inserts 10 are shown operatively located near the outer edge of a leaf spring 50 in a conventional leaf spring assembly 12 comprising individual leaf springs 13, 14, 15, 16, and 17 as illustrated in FIG. 1. The uppermost leaf spring 17 includes attachment points 8 at the outer ends. A suitable fastener (not shown) connects attachment points 8 to the frame of the vehicle. Attachment point 9 is located at the centerpoint of spring 13 and connects each spring at the respective centerpoint. A fastener (not shown) suitably connects attachment point 9 to an axle of a vehicle and ultimately acts as the point where the wheel input force of the vehicle suspension system is realized. In the exemplary illustration, eight leaf spring inserts would be utilized to sufficiently separate the engagement surfaces of the individual leaves 13, 14, 15, 16, and 17. In a typical vehicle having two leaf spring assemblies, sixteen inserts would be utilized. More or fewer inserts may be incorporated depending upon the desired configuration, number of springs, and engagement surfaces.

Figure 3:
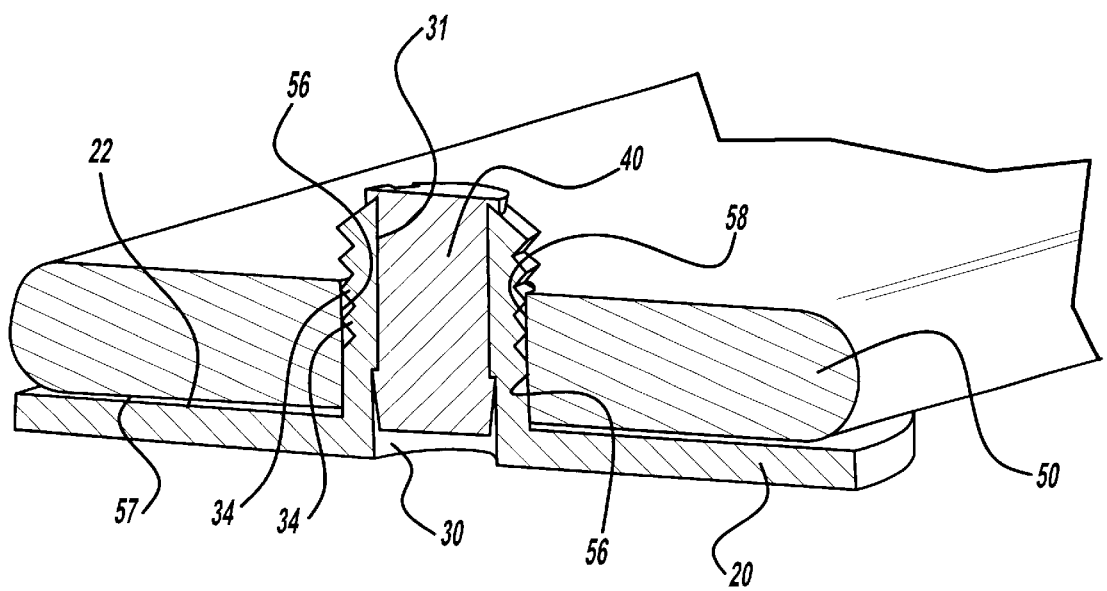
FIG. 3 is a cutaway view of the leaf spring insert shown disposed through an aperture in a leaf spring.

Turning now to FIGS. 2 and 3, the leaf spring insert 10 includes a body or base portion 20, stem portion 30, and an insert pin 40. The stem portion 30 includes a plurality of fingers or arms 32 that expand to accept insert pin 40. An aperture 58 is formed through leaf spring 50 and receives the stem portion 30 of spring insert 10. Ribs 34 of fingers 32 arranged radially extend radially outward to grip the inner wall 56 of aperture 58 as insert pin 40 is inserted through central bore 31 of stem portion 30. Body 20 concludes an inner face 22 which engages inner surface 57 of leaf spring 50.

The body 20, stem portion 30, and insert pin 40 are manufactured as one piece through a molding procedure. The configuration of the resultant molded piece is best shown in FIG. 2. The contact between insert pin 40 and stem portion 30 is such that the pin 40 may be detached from the stem portion 30 by an impact force, such as an impact by a hammer or other object. Detaching insert pin 40 enables insertion of insert pin 40 into stem portion 30 through central bore 31 formed by the fingers 32. Insert pin 40 has a tapered outer diameter such that finger portions 32 expand as the insert pin 40 is slidably introduced into central bore 31.

Figure 4:
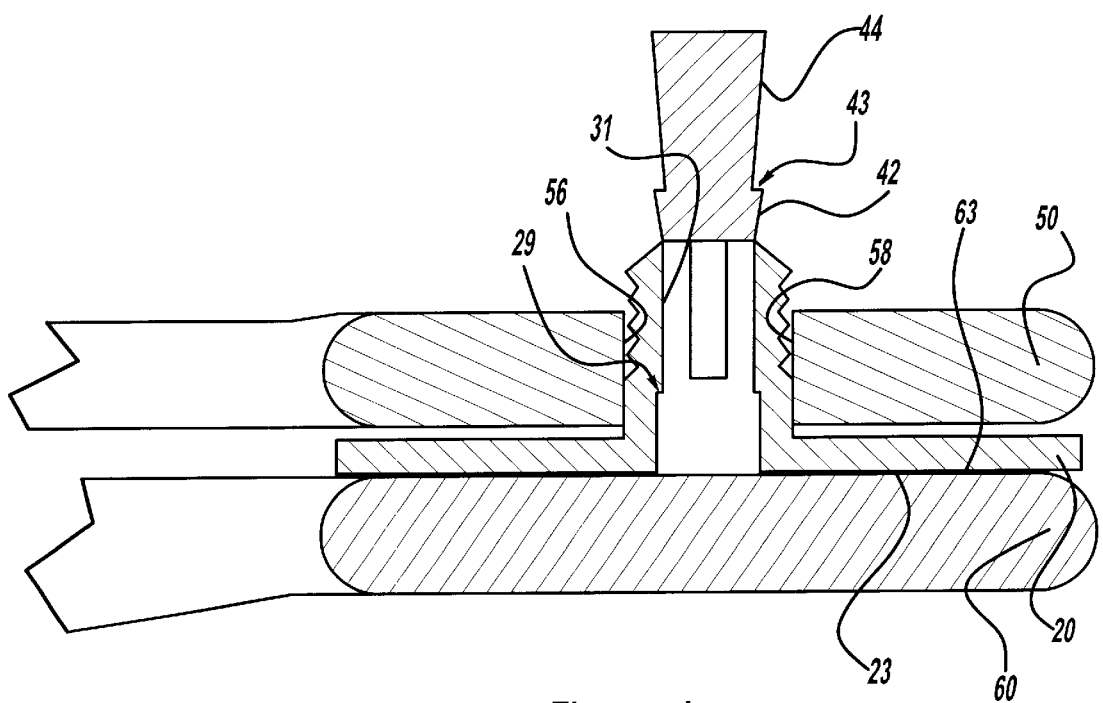
FIG. 4 is a cutaway view of the leaf spring insert shown prior to insertion of the pin.

Referring to FIG. 4, the leaf spring insert 10 is shown inserted through aperture 58 of leaf spring 50 prior to detaching insert pin 40. Insert pin 40 includes a lower flared section 42 and an upper flared section 44. Lip 43 separates flared sections 42 and 44 of insert pin 40 and retains insert pin 40 once it is sufficiently inserted into central bore 31 of stem portion 30. Lip 43 is retained by ridge 29 formed along a circumferential inner surface of fingers 32.

Base 20 of leaf spring insert 10 includes an outer face 23. Surface 23 includes circular protrusions 27, best shown in FIG. 7, that engage surface 63 of opposing leaf spring 60. As the wheel configured to cooperate with the associated leaf spring assembly encounters a force normal to the road surface, the individual leaf springs of the leaf spring assembly flex upward and downward with respect to the attachment points. The elliptical deflection causes surface 23 to slidably engage surface 63 of opposing leaf spring 60.

Figure 5:
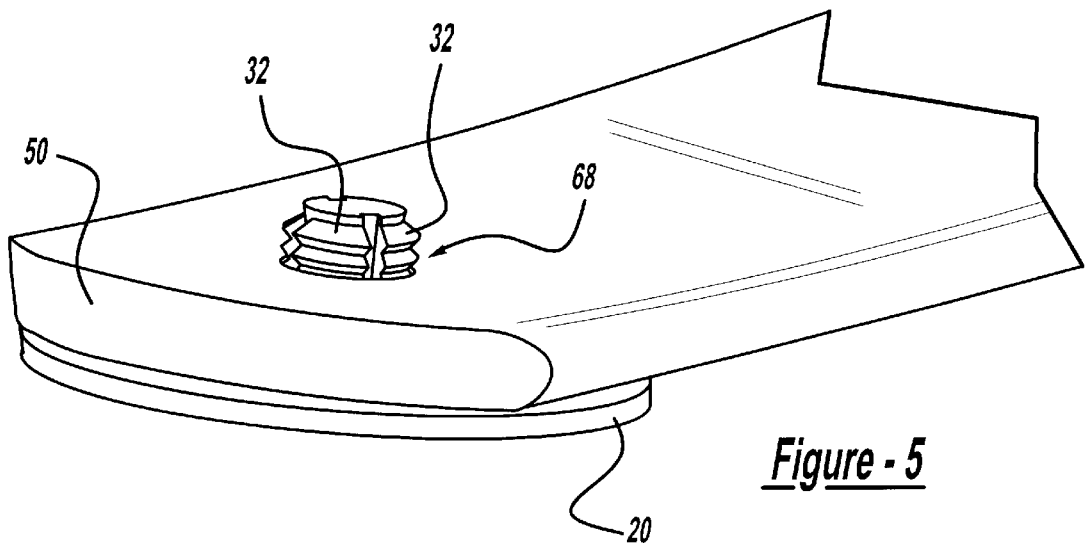
FIG. 5 is a perspective view of the leaf spring insert installed in a leaf spring.
Figure 6:
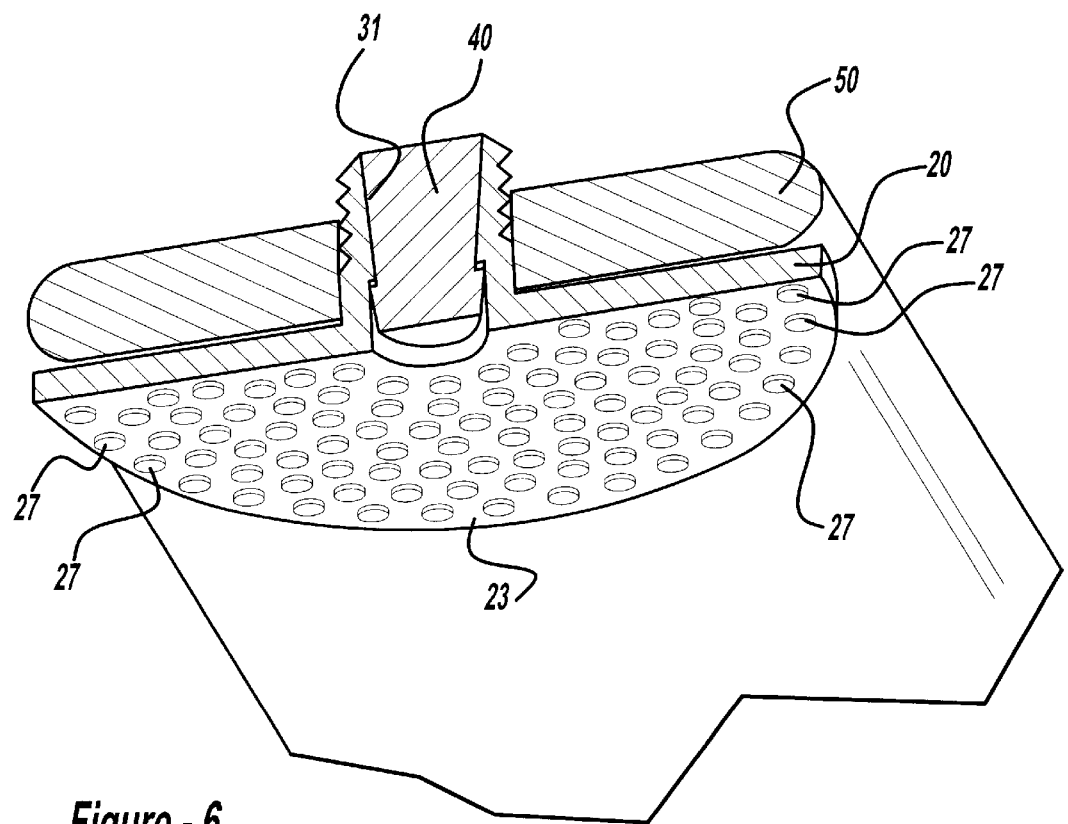
FIG. 6 is a cutaway view of an installed leaf spring insert shown to illustrate the circular extensions of the upper face.

FIGS. 5 and 6 illustrate assembly of leaf spring insert 10 and spring 50, with stem portion 30 inserted into and through aperture 58. Fingers 32 extend completely through and beyond aperture 58. The flared section 42 of insert pin 40 tapers to a smaller outer diameter than flared section 44 which improves the axial retention force at protruding end 68. The cooperation between lip 43 with ridge 29 and the increased axial force supplied by flared section 44 on ribs 34 of fingers 32 provides adequate retention needed to secure leaf spring insert.

Figure 7:
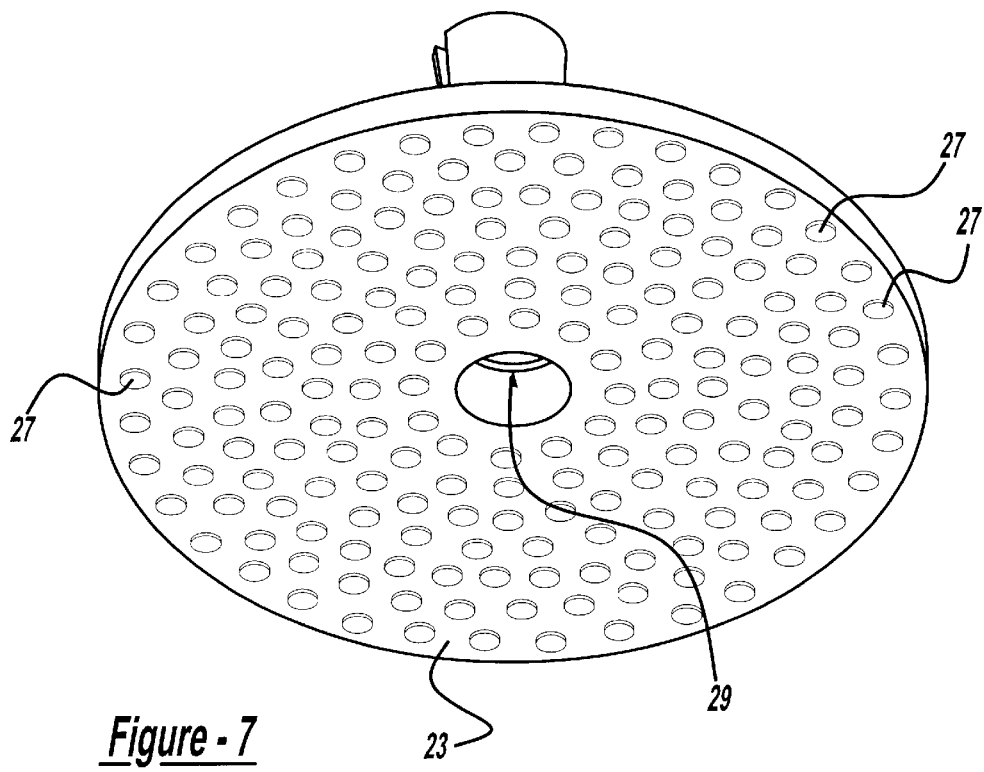
FIG. 7 is a perspective view of the leaf spring insert to illustrate the textured surface of the upper face.

Turning now to FIG. 7, circular protrusions 27 are extended from surface 23 of the body 20 to allow paints and sediments worn away from an adjacent spring to escape before a flush surface to surface contact is realized between surface 23 of body 20 and surface 63 of leaf spring 60.

Figure 8:
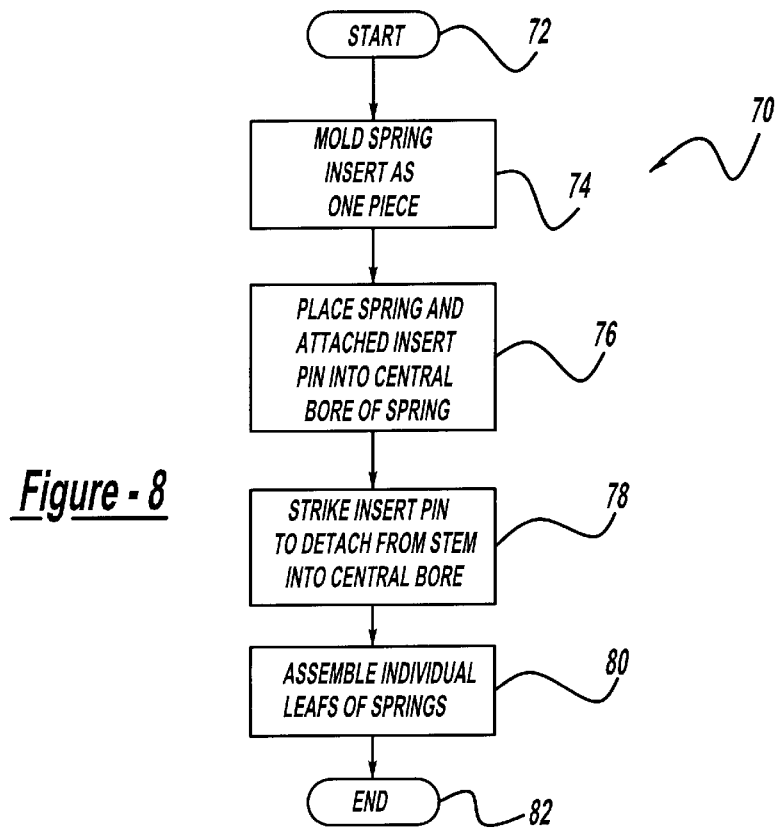
FIG. 8 is a flow diagram describing assembling the spring assembly utilizing the leaf spring insert of the present invention.

FIG. 8 depicts a flow diagram 70 for assembling a spring assembly using the spring insert of the present invention. The assembly process begins at start block 72 and proceeds to process block 74. At process block 74, the spring insert is molded as a one piece unit as described above, preferably through an injection molding process. Control then proceeds to process block 76 in which the stem and attached insert pin are placed into an aperture of a spring to which the insert will be attached. At process block 78, the insert 10 is struck using an impact tool, such as a hammer, to detach the insert pin from the stem, causing the insert pin to enter the central bore of the stem. Preferably, the insert pin includes a shoulder or a lip which engages a corresponding ridge in the central bore of the stem in order to retain insert pin within the stem, thereby causing the fingers to protrude outwardly, thereby increasing interference fit with the attached spring. Once the inserts are formed in the individual springs, individual springs are then assembled in the spring assembly, as shown at process block 80. Control then terminates at process block 82.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention.

What is claimed is:

1. A leaf spring assembly comprising:
   a first leaf spring;
   a second leaf spring including an aperture therethrough; and
   an insert disposed between said first and second leaf springs, said insert including a body portion and a stem portion, said stem portion having a plurality of fingers adapted to be inserted through said aperture of said second leaf spring, and a pin extending from and integral to said stem portion in a pre-installed position and adapted to be inserted through a central bore formed by said plurality of fingers to an installed position, thereby displacing said first and second fingers in outwardly to engage said aperture.

2. The leaf spring configuration of claim 1, wherein said plurality of fingers include radial ribs extending therefrom.

3. The leaf spring configuration of claim 2, wherein said body portion includes a face adjacent to said first leaf spring, said face having a plurality of protrusions extending therefrom.

4. The leaf spring configuration of claim 3, wherein said pin includes a circumferential ridge.

5. The leaf spring configuration of claim 4, wherein said plurality of fingers includes an inwardly extending lip engaged by said circumferential ridge of said pin.

6. The leaf spring configuration of claim 5, wherein said face of said body portion slidably engages said first leaf spring.

7. A method of reducing frictional noise associated with a first leaf spring and an adjacent second leaf spring, the method comprising the steps of:

molding a one piece component including a base, said base having a face separating the first and second leaf springs, a stem portion having a central bore, and a pin interconnected to the stem portion;

inserting said stem portion through an aperture in the first leaf spring; and removing said pin from said stem portion and displacing said pin into said central bore.

8. The method of reducing frictional noise of claim 7 wherein said face of said base includes a plurality of circular protrusions extending therefrom.

9. The method of reducing frictional noise of claim 7 wherein said stem portion includes a plurality of fingers.

10. The method of reducing frictional noise of claim 9 wherein the step of inserting said pin through said central bore further comprises expanding said plurality of fingers.

11. An apparatus for reducing frictional noise between leaf springs, comprising:

a body having a radially extending face and an aperture therethrough, said face separating the first and second leaf springs;

a stem having a central bore defined by a plurality of fingers, said plurality of fingers having first and second ends, said first ends of said plurality of fingers being coupled to a surface of said body around the perimeter of said aperture and projecting away from said surface of said body, said plurality of fingers further having inwardly extending ridge portions formed in said central bore which cooperate to form a retaining lip;

a plurality of retainers formed on an outer surface of at least one of said plurality of fingers; and an insert portion adapted to be inserted through said central bore of said stem, thereby expanding said plurality of fingers in outward directions, said insert portion having a circumferential ridge for engaging said retaining lip in a retained position, the insert portion having a pre-retaining position in which the insert portion is integrally attached to the stem and a retaining position in which the insert portion is detached from the stem.

12. The apparatus according to claim 11, wherein said face includes a plurality of protrusions extending therefrom.

13. The apparatus according to claim 12, wherein said retainers extend in a direction generally perpendicular to an axis of said central bore.

14. The apparatus according to claim 11, wherein said insert portion has a first insertion end and a second end, the insertion portion tapers from said second end to said first insertion end.

15. The apparatus according to claim 14, wherein said insert portion includes a first and second groove axially extending from said insertion end to said second end.

\* \* \* \* \*